United States Patent
Stahl

(10) Patent No.: US 11,938,823 B2
(45) Date of Patent: Mar. 26, 2024

(54) OPERATING UNIT COMPRISING A TOUCH-SENSITIVE OPERATING AREA

(71) Applicant: DAIMLER AG, Stuttgart (DE)

(72) Inventor: Volker Stahl, Althengstett (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/013,584

(22) PCT Filed: Jun. 21, 2021

(86) PCT No.: PCT/EP2021/066817
§ 371 (c)(1),
(2) Date: Dec. 29, 2022

(87) PCT Pub. No.: WO2022/002665
PCT Pub. Date: Jan. 6, 2022

(65) Prior Publication Data
US 2023/0264570 A1      Aug. 24, 2023

(30) Foreign Application Priority Data

Jun. 30, 2020   (DE) ..................... 10 2020 003 923.5

(51) Int. Cl.
*B60K 37/06*        (2006.01)
*B60K 37/02*        (2006.01)

(52) U.S. Cl.
CPC .............. *B60K 37/06* (2013.01); *B60K 37/02* (2013.01); *B60K 2370/1438* (2019.05); *B60K 2370/161* (2019.05); *B60K 2370/782* (2019.05)

(58) Field of Classification Search
CPC .............................. B60K 37/06; B60K 37/02; B60K 2370/1438; B60K 2370/161;
(Continued)

(56) References Cited

U.S. PATENT DOCUMENTS

| 6,392,636 B1 | 5/2002 | Ferrari et al. |
| 2007/0097096 A1 | 5/2007 | Rosenberg |

(Continued)

FOREIGN PATENT DOCUMENTS

| DE | 69930774 T2 | 2/2007 |
| DE | 102013020795 A1 | 6/2015 |
| EP | 2838004 A2 | 2/2015 |

OTHER PUBLICATIONS

International Search Report and Written Opinion dated Oct. 29, 2021 in related/corresponding International Application No. PCT/EP2021/066817.

(Continued)

*Primary Examiner* — Behrang Badii
(74) *Attorney, Agent, or Firm* — PATENT PORTFOLIO BUILDERS PLLC

(57) ABSTRACT

An operating unit includes a touch-sensitive operating area and control unit. The control unit determines an activation location on the operating area from the information relating to the touched regions. If the activation location is in a predefined field, the control unit performs a function assigned to the field. The control unit determines the activation location from a position on or in the region of a boundary line bounding a fingertip and that is at the front in the direction of movement of the finger on the surface of the operating area, only when a determined speed of movement of a course of the regions of the touched operating exceeds a predefined limit value. Otherwise, the activation location is determined from an area centroid of all regions of the operating area which have been touched by the finger at a point in time.

9 Claims, 2 Drawing Sheets

Figure 1:
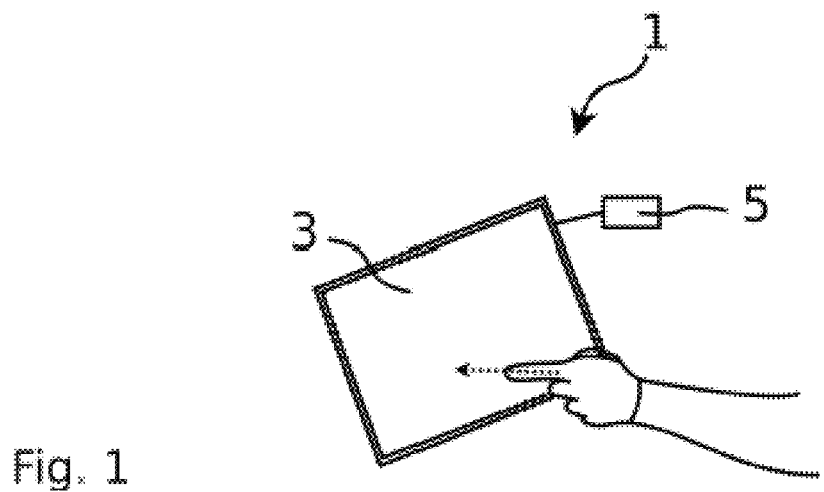

(58) Field of Classification Search
CPC ........ B60K 2370/782; B60K 2370/152; B60K 2370/1468; G06F 3/04186; G06F 3/0426; G06F 3/044; G06F 2203/04106
See application file for complete search history.

(56) References Cited

U.S. PATENT DOCUMENTS

| | | | | |
|---|---|---|---|---|
| 2008/0088597 | A1* | 4/2008 | Prest | G06F 3/0338 345/173 |
| 2010/0235793 | A1* | 9/2010 | Ording | G06F 3/0488 345/173 |
| 2011/0148770 | A1 | 6/2011 | Adamson et al. | |
| 2013/0050114 | A1* | 2/2013 | Backman | B60K 37/02 345/173 |
| 2014/0304636 | A1* | 10/2014 | Boelter | B60K 35/00 715/771 |
| 2015/0054780 | A1* | 2/2015 | Manba | G06F 3/04186 345/174 |
| 2015/0135108 | A1* | 5/2015 | Pope | A63F 13/42 715/767 |
| 2015/0175172 | A1* | 6/2015 | Truong | G10L 25/48 701/36 |
| 2018/0022217 | A1* | 1/2018 | Staude | G06F 3/04883 715/863 |

OTHER PUBLICATIONS

Office Action dated Apr. 7, 2021 in related/corresponding DE Application No. 10 2020 003 923.5.
Office Action dated Jun. 13, 2023 in related/corresponding JP Application No. 2022-581023.

* cited by examiner

OPERATING UNIT COMPRISING A TOUCH-SENSITIVE OPERATING AREA

BACKGROUND AND SUMMARY OF THE INVENTION

Exemplary embodiments of the invention relate to an operating unit comprising a touch-sensitive operating area and a control unit and a steering wheel comprising such an operating unit.

Movement-sensitive operating areas are known from the prior art. For example, US 2011/0148770 A1 relates to a method in which a user input is detected on a touch-sensitive surface, a complex touch pattern for the input is recognized, and an action is performed on the basis of the touch pattern. The touch pattern here is one of the following: A temporal pattern, a multi-shape, multi-touch gesture including finger and non-finger touches, a movement of one or more touches along a location on a keyboard, and a series of touches with varying intensity or tapping angle. The action is also one of the following: Executing a system action, adding features to text, and filtering to remove resting interactions.

US 2007/0097096 A1 also relates to a bi-modal touch-screen interaction, wherein the surface of a finger touching the surface of the touchscreen is determined and, based on the size, shape or orientation, it is determined whether the finger interaction is a finger-tip interaction or a finger-pad interaction, and based on this determination, one of two different modes is determined, one mode relating to a finger-pad interaction and the other mode relating to finger-tip interaction.

DE 10 2013 020 795 A1 further relates to a method for controlling functions of a motor vehicle or units contained therein, in which the movement or gesture of the hand and/or the fingers and/or the thumb is detected by a sensor unit arranged in the vicinity of the steering wheel and, if the movements or gestures correlate with predefined movements or gestures, this is considered to be an actuation of at least one virtual, real but non-existent operating element. The at least one virtual operating element is defined on the steering wheel here, wherein, by means of the sensor unit directed at the steering wheel, and an evaluation unit, the movements or gestures in connection with the steering wheel are evaluated, that is to say such that the sensor unit, in at least one predefined region on the steering wheel, detects movements or gestures of the hand and/or the fingers and/or the thumb and forwards them to an evaluation unit, the evaluation unit compares detected movements or gestures made relative to the steering wheel with at least one predefined saved pattern, and the evaluation unit triggers a predefined switching step in the event of predefined correspondence with the at least one pattern.

DE 699 30 774 T2 further relates to a capacitive touchpad to provide an electric output signal for selectively controlling the movement of a visual pointer display via a two-dimensional display screen, comprising: A plurality N of individual capacitance measurement cells arranged in a first two-dimensional row/column array, wherein the first array has N row/column interfaces and the first array occupies a generally planar region designed to act together with a finger contact surface area in order to generate an output signal for controlling the movement of the indicator, wherein each individual measurement cell has a unique output signal which changes according to a positional relationship to the tip of a human finger, a plurality N of individual resistor nodes arranged in a second two-dimensional row/column array, wherein the second array has N row/column interfaces in an arrangement corresponding to the N row/column interfaces of the first array, circuit means applying each unique output signal of the measurement cells to a corresponding one of the resistor nodes of the second array, first computation means connected to the second array in order to calculate a centroid signal as a function of the position of a finger contact surface area on the planar region of the first array, and first output means connected to the first computation means and providing a display movement control signal as a function of the centroid signal.

If such an area centroid of the touching finger contact surface area or a reference point calculated by another method and largely lying in the middle of the finger contact surface area is used as a reference point, a user has to move their finger, in a swiping movement over the user interface, over a predefined field until the reference point, that is to say the centroid, lies in the region of the field, as a result of which any triggering of the function assigned to the field is perceived after a delay.

Exemplary embodiments of the invention are directed to improving a touch-sensitive operating unit, in particular for use in a vehicle.

A first aspect of the invention relates to an operating unit comprising a touch-sensitive operating area and a control unit, wherein the operating area is designed to detect regions of the operating area that have been touched by a user's finger and to transmit information relating to the regions that have been touched to the control unit, wherein the control unit is designed to determine an activation location on the operating area from the information relating to the regions that have been touched and, if the activation location is in a predefined field of the operating area, to perform a function assigned to the field. The control unit is designed to determine the activation location on or in the region of a boundary line of the touching finger, which bounds a fingertip or the tip of a finger and is at the front in the direction of movement of the finger on the surface of the operating area.

The touch-sensitive operating area is part of a touchpad or touch display. In the case of a touch display, the control unit may be arranged on the underside of a screen so that the screen together with its control unit is perceived as a single device from the outside. In particular, the touch-sensitive operating area has a matrix of resistive sensor cells, but preferably a matrix of capacitive sensor cells. When a human finger approaches very close to the capacitive sensor cells, the respective capacitance changes so that the approach of the finger is recognized. Each of these, in particular capacitive, sensor cells of the screen delivers at least one piece of information to the control unit as to whether a touch on the respective sensor cell is detected, and, in particular, more preferably also what the signal value is on the respective sensor cell. Such a signal value indicates, in particular, the intensity of the touch depending on a distance of the finger regions on the respective sensor cell.

The activation location is a location or region on the operating area that is touched by a finger. The activation location on the operating area can be connected to a function which is performed by the control unit, for example a field represented by the displaying of a symbol.

The symbol is displayed either on the user interface itself by means of static figurative markings, by the displaying of icons on a touch-sensitive screen or, in the case of an operating area designed as a touchpad, by being displayed on an assigned screen.

The function is triggered as soon as the activation location, that is to say the boundary line or boundary line region of the fingertip that is at the front in direction of movement of the finger on the operating area, remains for a predefined time in the predefined region of the field visualized by the symbol. The counting of the predefined time starts when the predefined field is reached for the first time by the boundary line or boundary line region of the fingertip. Swiping gestures over the activation location can also be generated if it changes over time. For example, an activation location changing on the surface of the operating area can operate a slide control.

From the direction of movement of the finger, the control unit determines where the fingertip of the touching finger and, in particular, the boundary line of the fingertip of the touching finger is to be located relative to the operating area and, in particular, relative to all of the regions on the operating area that have been touched. The underlying assumption is that the finger in the corresponding application does not hit the surface of the operating area in a perfectly perpendicular direction, but instead has a direction of movement along the surface of the operating area, that is to say performs a swiping movement. This tangential component of the movement of the finger is taken into consideration in the concept of the direction of movement. The location of the distal end of the finger relative to the operating area is determined from this direction of movement. As a result, the position or the region of the boundary line of the touching finger relative to the operating area is known in the case of a touching input by the user.

The fingertip comprises the tip of a finger here and describes, in particular, the distal end of the user's finger at the opposite end to the base of the finger that is at the proximal end of the finger. The fingertip also relates, in particular, to a side of the finger opposite the fingernail.

As the activation location selected by the touch of the finger is not determined, as in the prior art, by reference to a centroid of the surface area of all of the regions on the operating area which have been touched, but is instead determined depending on the position or region-related position of a boundary line of the fingertip, a function can be triggered more quickly. Nor is any undesired field or symbol "accidentally" selected merely because it is covered by the finger. According to the invention, the control unit is designed to correlate the activation location to the position or the region of the boundary line of the finger bounding the fingertip, only when a determined speed of movement of a course of the regions of the operating area that have been touched exceeds a predefined limit value, and otherwise to determine the activation location from an area centroid of all regions of the operating area which have been touched by the finger at a point in time.

The speed of movement can be detected, for example, by a camera unit during the construction of the touch by the user. Alternatively, and preferably thereto, similarly to the previous embodiment, the speed of movement can be derived from a course of the regions on the operating area which have been touched over time. This embodiment advantageously assumes that the user intends to select a field visualized by a symbol in the region of the tip of their finger only if they are sufficiently intent, that is to say using a minimum speed, on moving to this field comprising the activation area with the tip of their finger. In the event of a correspondingly quick speed of movement lying above the minimum speed, the user, for example, scrolls through a menu, it being advantageous here, for the purposes of a rapid system response, for one or more symbols to be selected as soon as they are touched by a boundary line of the finger which is in the direction of movement. Conversely, if the user moves their finger very slowly over the operating area, then, in terms of operational reliability, it is advantageous if a symbol is selected when touched by the area centroid of the finger.

It is therefore an advantageous effect of the invention that only accidentally covered regions on the touch-sensitive operating area are not activated, a field instead only ever being activated if it is touched by the boundary line of the user's finger bounding the fingertip. In particular, in applications in the automotive sector, for example, a touch-sensitive operating area on the steering wheel, where the user's finger travels over an edge of the operating area in the direction of a field in the middle of the operating area, only the field visualized by a corresponding symbol that has been deliberately selected in the swiping movement of the tip of a finger or fingertip is therefore activated.

According to an advantageous embodiment, the control unit is designed to determine the activation location from the position of a highest signal value or from an area centroid of the signal values detected on the boundary line or in the region of the boundary line of the operating area in the regions which have been touched. In particular, if the touch-sensitive operating area has a matrix-shaped arrangement of sensor cells, each of which is in turn designed to determine a respective signal value, not only is there a piece of binary information relating to the existence of a touch or the absence of a touch on each of the sensor cells, but also a measure of the intensity of the touch on the respective sensor cell. The intensity is determined by the level of the signal values, which in turn depend on the distance of the finger parts from the operating area.

For example, the distance of the finger parts and the shape of the touching surface area depend on how firmly the user presses onto the operating area.

This advantageously results in soft and presumably unintended touches of the surface of the touch-sensitive operating area not being classified by the control unit as presumed touches. According to this embodiment, if signal values are detected in the region of the boundary line or the tip of the touching finger, then, on the one hand, the position of the highest signal value of touched sensor cells on this boundary line or in the region of the boundary line can be determined as the activation location, as a result of which a reliable selection of the predefined field is achieved if there are significant differences in the signal values. The determination of an area centroid of the sensor signals that are on or in the region of a boundary line bounding a fingertip and is at the front in direction of movement prevents any overweighting of a signal value that is slightly above the others if there are signal values at a similar level on or in the region of the boundary line. Such an area centroid determined by methods known from the prior art may be understood as a geometric interpretation of the arithmetic mean (specifically the standardized integral) of location vectors of the sensor cells.

According to an advantageous embodiment, the operating unit has a camera unit, the area of coverage of which is directed at the operating area, wherein the control unit is designed to determine the direction of movement of the finger from the camera unit data.

The camera unit has, in particular, a stereo camera so that it can also obtain spatial information from images. The area of coverage of the camera unit is preferably configured so that, by means of image recognition, the direction of movement of the finger is recognized and the location of the fingertip or the tip of a finger relative to the wrist is also recognized at the same time. This advantageously represents a reliable method of detecting the direction of movement of the finger and, in particular, also the orientation of the finger along the surface of the operating area.

According to a further alternative or additional embodiment, the control unit is designed to determine the direction of movement of the finger from a course of the regions on the operating area which have been touched over time.

The course of the regions on the operating area that have been touched over time is determined, in particular, by means of a history of sensor cells of the operating area that are classified as having been touched. In particular, if the user's finger constructs a touch of the operating area coming from an edge in the direction of the center of the operating area, this results in a surface area of the regions of the operating area that have been touched which becomes increasingly large when regarded over time and spreads out structurally from the edge inwards. An advantage according to this embodiment is that there is no need for any camera unit to recognize the direction of movement of the finger on the surface of the operating area.

According to a further advantageous embodiment, the control unit is designed to correlate the activation location to the position or the region of the boundary line bounding the fingertip only if a touch of the finger from the edge of the operating area is recognized by the control unit.

This embodiment in turn advantageously takes account of the fact that, in the case of a tangential construction of the touch of the finger along the surface of the operating area in the direction of a center of the operating area starting from the edge, the user instructs the predefined field to trigger a function with their fingertip. In order to produce the quickest possible system response, the function is triggered by the predefined field being reached by the boundary line or the boundary line region of the fingertip, preferably after being held in the field. On the other hand, if a user places their finger in a region of the operating area remote from the edge, they wish to activate a function directly or, if applicable, with a swiping movement with the midpoint of their finger starting from there so that, in this case, the activation location, for example, is preferably determined by determining an area centroid of the sensor signals caused by the entire finger contact surface area.

According to a further advantageous additional or alternative embodiment, the control unit is designed preferably to correlate the activation location to the position or the region of the boundary line bounding the fingertip only if the surface area of the regions that have been touched increases in its course in the direction of the center of the operating area from an edge of the operating area over time. The increase in the surface area of the regions that have been touched represents a common operating state in which determination of the activation location using a conventional method, such as by determining the area centroid of the touched surface area, results in unintended erroneous triggering. For example, if the user pushes their thumb from the edge of the operating field on an operating area arranged, for example, on a steering wheel in the direction of a field to be selected, for example in the middle of the operating field, then the finger contact surface area becomes continually larger until the symbol is reached. The position of the area centroid therefore differs significantly from the position of the fingertip or from the boundary line or the region of the boundary line. Since the customer wishes to select the field indicated by a symbol, activation is triggered when the boundary line reaches the symbol region, that is to say the field region. Advantageously, the function assigned to the field is triggered as soon as possible in accordance with the user's wish. At the same time, an unintended selection of a field by activation of an activation location lying in the center of the finger contact surface area, for example corresponding to the area centroid, is avoided.

According to a further advantageous embodiment, the control unit is designed to classify a respective position on the operating area as having been touched only if a predefined limit value of a level of a signal value at the respective position of the operating area is exceeded. See above for a definition of the signal value and explanations, in particular regarding capacitive sensor cells.

The operating area is preferably designed as a touch-sensitive screen. On the screen, the fields to be operated are represented by means of symbols also referred to as icons.

A further aspect of the invention relates to a steering wheel comprising such an operating unit and a contact sensor unit arranged in a steering wheel rim, wherein the contact sensor unit is designed to determine the direction of movement of the finger on the surface of the operating area on the basis of a touching position of a hand on the steering wheel in relation to the operating unit, and to transmit the determined direction of movement to the control unit.

The contact sensor unit is designed, in particular, to detect whether a driver of the vehicle, who corresponds to the user specified above, has one or both hands on the steering wheel. Whilst such a contact sensor unit is used, in particular, as a driver assistance system to increase safety, according to this further aspect of the invention, the information from the contact sensor unit is used to determine a position of the hand on the steering wheel and therefore, with this prior knowledge, to draw conclusions as to the direction of movement of the finger in the construction of the touch, and to transmit this information to the control unit. The operating area of the operating unit is preferably arranged on the steering wheel, preferably on a spoke of the steering wheel, particularly preferably on an end of the spoke of the steering wheel lying radially outside in the region of a transition of the spoke of the steering wheel to the steering wheel rim.

Advantages and preferable refinements of the proposed steering wheel can be seen from an analogous and corresponding transfer of the statements made above in relation to the proposed operating unit.

BRIEF DESCRIPTION OF THE DRAWING FIGURES

Further advantages, features and details are given in the following description in which—if applicable with reference to the drawings—at least one exemplary embodiment is described in detail. Identical, similar and/or functionally identical parts are given the same reference numerals.

Figure 2:
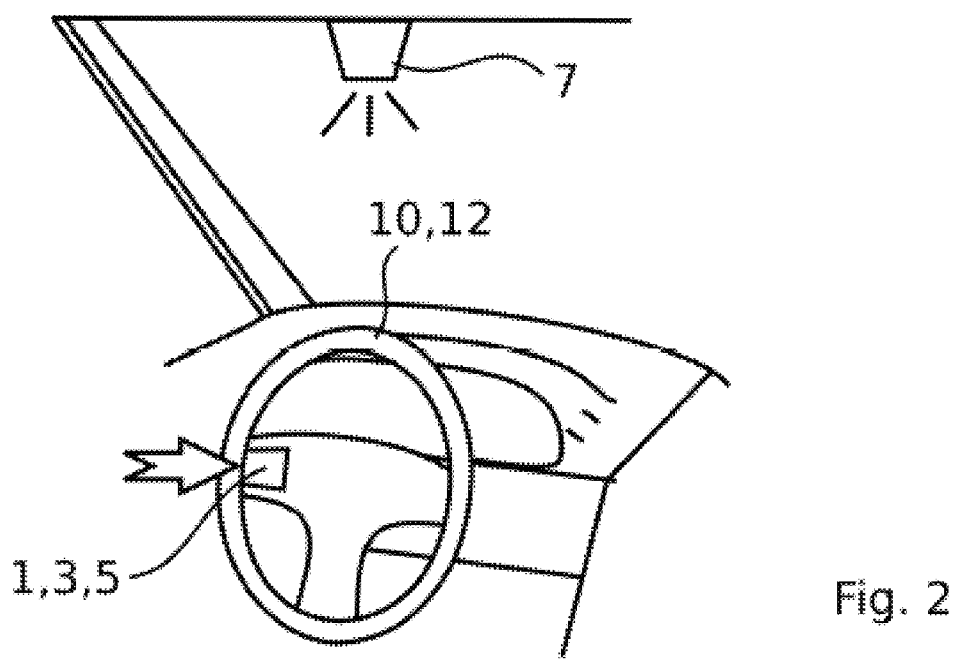
Figure 3:
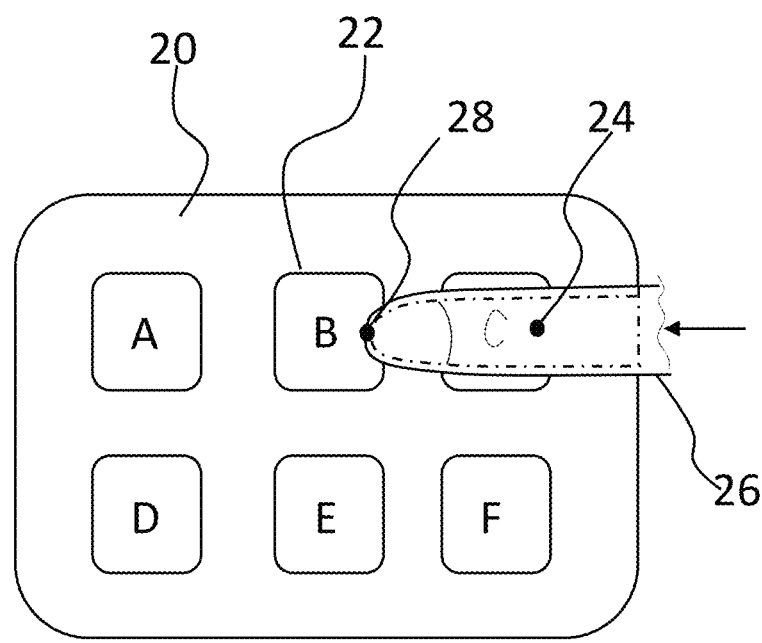
Figure 4:
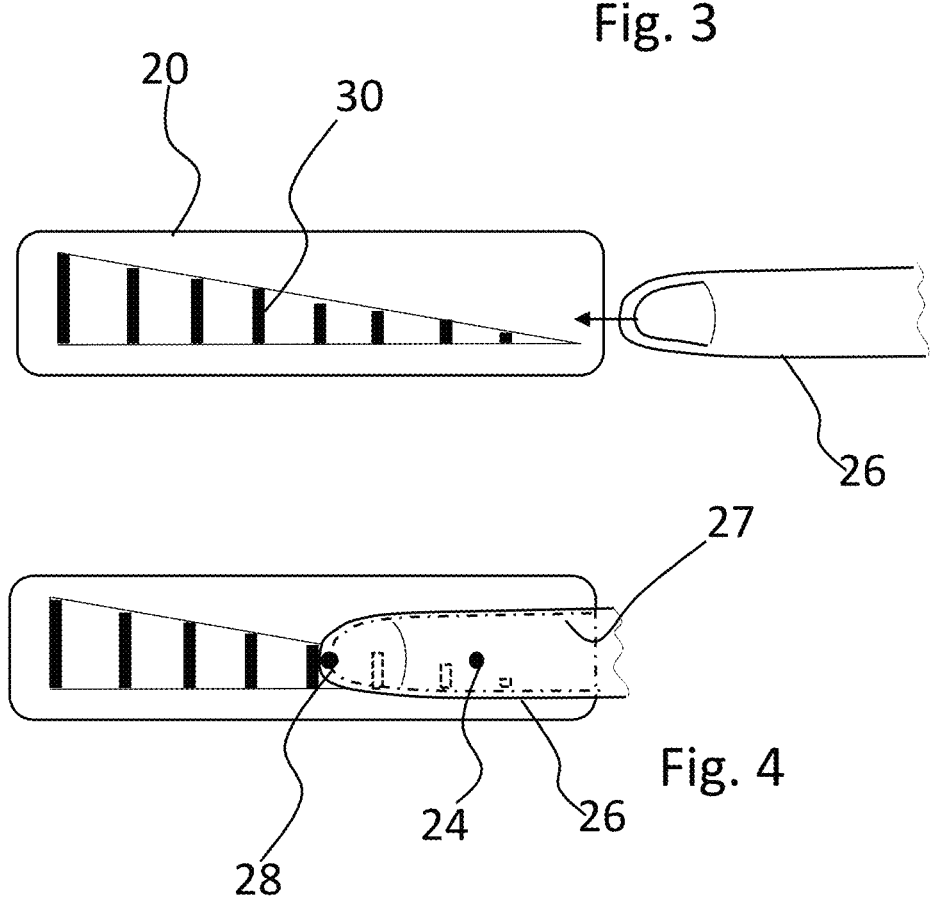

In the figures:

FIG. 1 shows an operating unit according to an exemplary embodiment of the invention, FIG. 2 shows a steering wheel comprising an operating unit according to a further exemplary embodiment of the invention, FIG. 3 shows an operating field with an operating finger and FIG. 4 shows an operating field as a slide control with an operating finger.

The illustrations in the figures are schematic and not to scale.

DETAILED DESCRIPTION

FIG. 1 shows an operating unit 1 comprising an operating field designed as a touch-sensitive screen 3 and a control unit 5. The control unit 5 is connected to the screen 3 and receives data from the latter. The screen 3 serves to detect regions of the surface of the screen 3 that a user touches with their finger. The screen 3 also transmits information relating to the detection of the regions that have been touched to the control unit 5. The control unit 5 then determines an activation location on the screen 3 from the information relating to the regions which have been touched. If no function is assigned to the activation location on the screen 3, no function is performed. However, if the activation location is in a predefined field or region of a respective symbol shown on the screen 3, a function assigned to the symbol is performed by the control unit 5. The control unit 5 determines the activation location in the region of a boundary line bounding the touching fingertip. This boundary line is at the front in the direction of movement of the finger on the surface of the screen 3. An area centroid of the signal values in the edge region of the fingertip is determined by the control unit 5 here and, after the touch has been constructed, the location of this area centroid on the surface of the screen 3 is determined as the activation location. The edge region may only comprise the boundary line itself or a region of predefined breadth starting from the boundary line.

The direction of movement of the finger is determined by the control unit 5 from a course of the regions on the screen 3 that have been touched over time. The direction of movement is shown by an arrow in FIG. 1. However, the control unit 5 correlates the activation location to the area centroid of the boundary line or the region of the boundary line only if a touch of the finger from the edge of the screen 3 is recognized by the control unit 5. This is the case if the surface area of the regions that have been touched increases in their course from an edge of the screen 3 in the direction of the interior of the screen 3 over time. This is the case in FIG. 1—the user's finger is swiping from outside the screen over the lower edge upwards to the left to an icon which is not shown.

FIG. 2 shows a steering wheel 10 comprising an operating unit 1. Unlike the example in FIG. 1, the screen 3 and the control unit 5 are arranged in a shared unit here. The screen 3 is arranged so that the thumb on the driver's left hand swipes over the left edge of the screen (when the steering wheel is in the straight position) along the surface of the screen 3 inwards in the direction of the axis of rotation of the steering wheel. A contact sensor unit 12 is arranged in the steering wheel rim, wherein the contact sensor unit 12 is designed to determine the direction of movement of the finger on the surface of the screen 3 on the basis of a touching position of the hand on the steering wheel 10 in relation to the operating unit 1, and to transmit the determined direction of movement to the control unit 5. This means that, when the driver's left hand is recognized on the steering wheel rim in the region of the screen 3, it is assumed that their finger is also moving over this edge coming from the steering wheel rim on the surface of the screen 3. A camera unit 7, the area of coverage of which is directed at the screen 3, additionally detects the direction of movement. Only if the control unit 5 recognizes a touch from the edge of the screen 3 from both sources, that is to say according to data from the contact sensor unit 12 and the camera unit 7, does the control unit 5 correlate the activation location to the area centroid on or in the region of a boundary line bounding a fingertip.

The mode of operation of the operating unit according to the invention compared to an embodiment according to the prior art is set out below by reference to FIGS. 3 and 4.

FIG. 3 shows an operating field 20 comprising symbols A to F specified as icon 22. The icons 22 represent a predefined field to which a function is assigned if the activation location that has been touched by the finger 26 is within one of the fields of the icons 22A-F. For clarity, only one icon A to F is given the reference numeral 22. The operating finger 26 swipes from right to left in the direction of the icon B starting from the edge of the operating field 20. With the movement from the edge, the sensor signal field 27 indicated by a dotted line is constructed by the flat swiping movement of the finger, that is to say, in this region, for example, sensor signals are generated on a capacitive touched surface area or a capacitive display. Based on the direction of movement from the edge, the operating unit recognizes that the user is heading for an icon to be activated with their finger and, in the present case, wishes to activate the function assigned to the icon 22 designated B. Based on this user's wish, the activation location 28 brought about by the touch of the finger in direction of movement of the finger is determined on or in the region of the boundary line which is at the front.

The function assigned to the icon 22 is performed as soon as the activation location 28 is in the field of the icon 22 designated B. The user thereby gets a quick system response.

In contrast thereto, determining the activation location through a method of determination known from the prior art, for example determination of the centroid of the sensor signal field 27, would lead to an activation location 24 which, contrary to the user's wish, would cause the function assigned to the icon 22 designated C to be triggered. The activation location is preferably only selected by the boundary line which is at the front here if a determined speed of movement over the operating area of the sensor field is above a predefinable limit value. However, if a user, for example, places a finger onto the sensor field and moves the finger slowly around the position or possibly to the next position, according to the user's wish, a determination of the activation location from an area centroid of the region that has been touched by the finger is to be preferred.

FIG. 4 shows, as a further possible application, an operating unit comprising a touch-sensitive operating field 20 in which, for example, a volume of an audio system can be adjusted by selecting steps represented by columns 30, that is to say the associated volume is adjusted as soon as the activation location of the finger is in the region of a column 30. In the image shown in FIG. 4 above, an operating finger is moving closer to the operating field 20 from the right. The bottom illustration shows a situation in which the finger has been pushed into the operating field 20 as far as the fourth column 30 starting from the right-hand edge and is lying flat so that the sensor signal field 27 shown by a dotted line is generated. Since it is obvious from the type of actuation that the user wishes to adjust the volume assigned to this fourth column, the activation location 28 brought about by the touch of the finger in the direction of movement of the finger is determined on or in the region of the boundary line that is at the front. The distance of travel of the finger on the operating field therefore corresponds to a change in the activation location 28. The user is therefore given a clear assignment of their finger position to their user's wish, thus guaranteeing easy actuation. In contrast thereto, in accordance with the previous exemplary embodiment, the activation location 24 determined from the area centroid of the sensor surface area 27 would be unsuitable in the case of a speed of movement that is above a limit value since the user cannot tell how far they have to push their finger onto the operating field in order to activate the desired volume. In particular, in the event that the finger is already being pushed into the operating field 20 with a corresponding speed of advance, a spontaneous, comprehensible response is conveyed to the user by determining the activation location by the boundary line which is at the front. In the case of slow or quasi-static movements below the threshold speed, starting from a preferably static finger contact surface area on the operating field 20 where the activation location is determined via the area centroid, if there is a movement following the finger contact surface area, the activation location is also to be determined via the area centroid so that the determined activation locations in relation to their finger movements can still be understood by a user.

The operating unit according to the invention allows a clear improvement in operation of operating areas arranged, for example, on steering wheels, door switch fields or the dashboard which, in particular, owing to their spatial arrangement with respect to the user, favor operation with fingers laid fully flat. The operating areas are, for example, capacitive operating areas with touch-sensitive sensor comprising static field which, for example, replace mechanical switches. In a further embodiment, the operating area is a touchpad with which an assigned screen can be operated by touch, or a touch display.

Although the invention has been illustrated and explained in more detail through preferred exemplary embodiments, the invention is not limited by the examples disclosed and other variations can be derived herefrom by the person skilled in the art without leaving the scope of protection of the invention. It is therefore clear that there are numerous possible variations. It is likewise clear that, for example, said embodiments really only show examples which are not to be perceived in any way as approximately limiting the scope of protection, the possible applications or the configuration of the invention. Instead, the above description and the description of the figures enable the person skilled in the art to implement the exemplary embodiments in practice, the person skilled in the art, in the knowledge of the inventive concept disclosed, being able to make numerous changes, for example in terms of the function or arrangement of individual elements specified in an exemplary embodiment, without leaving the scope of protection which is defined by the claims and their legal equivalents, such as further explanations in the description.

The invention claimed is:

1. An operating unit, comprising:
a touch-sensitive operating area; and
a control unit, wherein
the touch-sensitive operating area is configured to detect regions of the touch-sensitive operating area touched by a user's finger and configured to transmit information relating to the regions touched by the user's finger to the control unit,
the control unit is configured to determine an activation location on the touch-sensitive operating area from the information relating to the regions touched by the user's finger and, if the determined activation location is in a predefined field of the touch-sensitive operating area, is configured to perform a function assigned to the predefined field,
the control unit is configured to determine the activation location
on or in a region of a boundary line bounding a fingertip and that is at a front in a direction of movement of the user's finger on a surface of the touch-sensitive operating area, only when a determined speed of movement of a course of regions of the touch-sensitive operating area touched exceeds a predefined limit value, and
from an area centroid of all regions of the touch-sensitive operating area touched by the finger at a point in time when the determined speed of movement of the course of regions of the touch-sensitive operating area touched does not exceed the predefined limit value.

2. The operating unit of claim 1, wherein the control unit is configured to determine the activation location from a position of a highest signal value or from an area centroid of signal values detected on the boundary line or in the region of the boundary line of the touch-sensitive operating area in regions that have been touched.

3. The operating unit of claim 1, further comprising:
a camera having an area of coverage directed at the touch-sensitive operating area, wherein the control unit is configured to determine the direction of movement of the user's finger from data from the camera.

4. The operating unit of claim 1, wherein the control unit is configured to determine the direction of movement of the user's finger from a course of the regions touched over time on the touch-sensitive operating area.

5. The operating unit of claim 1, wherein the control unit is configured to correlate the activation location to a position or the region of the boundary line bounding the user's fingertip if a touch of the user's finger from an edge of the touch-sensitive operating area is recognized by the control unit.

6. The operating unit of claim 5, wherein the control unit is configured to correlate the activation location to the position or the region of the boundary line bounding the fingertip if a surface area of the regions that have been touched increases in its course from the edge of the touch-sensitive operating area in a direction of an interior of the touch-sensitive operating area over time.

7. The operating unit of claim 1, wherein the control unit is configured to classify a respective position on the touch-sensitive operating area as touched only if a predefined limit value of a level of a signal value at a respective position of the touch-sensitive operating area is exceeded.

8. The operating unit of claim 1, wherein the touch-sensitive operating area is a touch-sensitive screen.

9. A steering wheel, comprising:
an operating unit according to claim 1 and a contact sensor unit arranged in a steering wheel rim of the steering wheel, wherein the contact sensor unit is configured to determine the direction of movement of the user's finger on the surface of the operating area based on a touching position of a hand on the steering wheel in relation to the operating unit, and configured to transmit the determined direction of movement to the control unit.

* * * * *